May 12, 1931.  L. K. SNELL  1,805,053
BRAKE MECHANISM
Filed July 6, 1926  2 Sheets-Sheet 1

Inventor
Lyle K. Snell,
By
Attorneys

May 12, 1931.  L. K. SNELL  1,805,053
BRAKE MECHANISM
Filed July 6, 1926   2 Sheets-Sheet 2

Patented May 12, 1931

1,805,053

UNITED STATES PATENT OFFICE

LYLE K. SNELL, OF DETROIT, MICHIGAN

BRAKE MECHANISM

Application filed July 6, 1926. Serial No. 120,660.

This invention relates to brake mechanism for stopping or slowing the motion of vehicles and applies more particularly to braking systems in which fluid pressure is employed for brake application. The invention also particularly appertains to four-wheel brake mechanisms where braking means is applied to each wheel and wherein each braking means is operated by fluid under pressure and a single control is employed for controlling the application of said fluid to operate all of said braking means.

An object of the present invention is to provide means whereby the braking effort applied to the front wheels of the vehicle may be less or more than that applied to the rear wheel brakes and whereby this braking effort will be applied to each of the front or rear brakes independently of the operation of the other. Another object is to provide means for automatically varying the braking effort applied to the front or steering wheels of the vehicle so that, when turning from a straight ahead direction of travel, the braking effort upon such wheels will be reduced, and to also so arrange such means that such effort will be reduced in proportion to the increase in the angular relation of said wheels to the longitudinal center line of the vehicle. It is also an object to provide certain other new and useful features in the construction, arrangement and operation of brake mechanisms, all as hereinafter more fully set forth.

With the above and other ends in view, the invention consists in the matters hereinafter set forth and more particularly pointed out in the appended claims, reference being had to the accompanying drawings, in which Figure 1 is a view of a braking system embodying the present invention, showing the same in side elevation and illustrating the application thereof to a motor vehicle;

Fig. 2 is a plan view of Fig. 1;

Fig. 3 is a detail showing a pressure relief device in side elevation and with a portion thereof in section to more clearly disclose the construction;

Fig. 4 is a detail view of the pressure relief device taken at right angles to that of Fig. 3 and showing the same in longitudinal section;

Since the advent of four-wheel brakes as commonly applied to the four wheels of motor vehicles, it has developed that accidents are often occasioned by the application of excessive braking power to the front or steering wheels of the vehicle while traveling at high speeds and while these wheels are at an angle to the line of travel, as in turning corners, thus retarding their rotation to such an extent that the momentum of the vehicle will cause these wheels to skid or slide laterally in contact with the road and thus fail to turn the vehicle from its course. It is therefore of vital importance to provide in such systems, an arrangement whereby the excessive application of braking power to the front or steering wheels is obviated and also that the braking power be properly proportioned between front and rear wheels according to the proportion of load carried thereby to secure with safety, a maximum of braking effect. It is also desirable that the braking power applied to the front wheels be automatically regulated and proportioned according to the degree of deflection of the front wheels from their forward line of travel, such braking power being automatically reduced with the increase in steering movement of said wheels.

Figure 1:
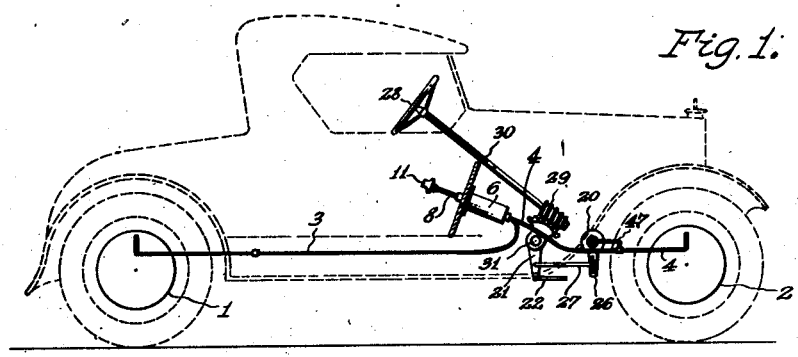
Figure 5:
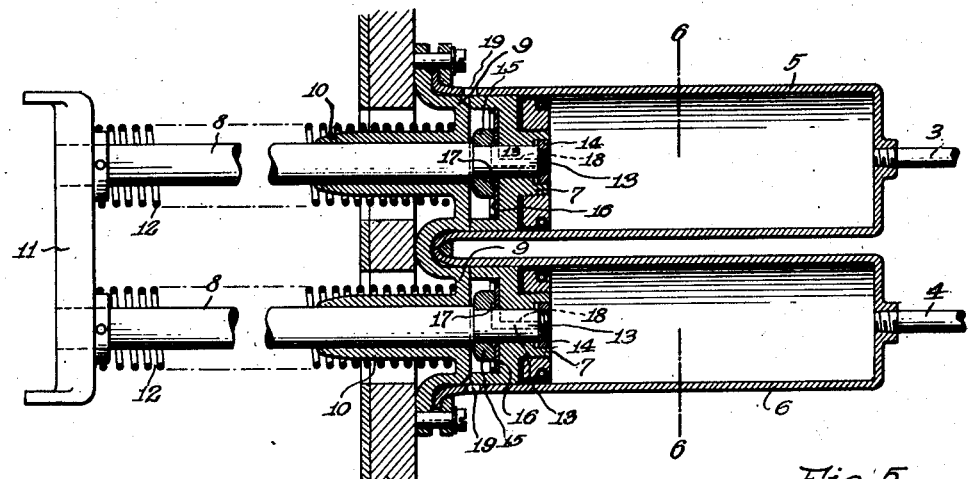
Fig. 5 is a detail of a pressure producing device, showing the same in longitudinal section.
Figure 6:
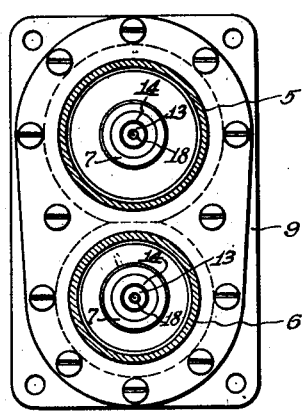
Fig. 6 is a transverse section of Fig. 5 substantially upon the line 6—6.

In Figures 1 and 2, the application to a motor vehicle of a system embodying the present invention, is illustrated, braking means of any suitable construction, not shown in detail but indicated at 1 and 2 and which means is adapted to be operated by fluid under pressure, being mounted upon or adjacent each of the four wheels of the vehicle to retard or stop their rotation and thus stop or check the progress of the vehicle, the present invention relating more particularly to the manner of supplying or control of such fluid to such braking means. This fluid under pressure is conducted to the brakes 1 on the rear wheels, through any suitable arrangement of pipes or tubes 3, from a suitable source under the immediate control of the driver and to the brakes 2 on the front wheels, from such source through any suitable or common arrangement of tubes or conduits 4. Preferably, the means for supplying air to these conduits and forcing it therethrough under pressure comprises a pair of cylinders, the conduit 3 being connected to the cylinder 5 and the conduit 4 being connected to the cylinder 6, said cylinders being arranged side by side and each having a piston 7 therein connected to a piston rod 8 which rods extend outwardly through a head 9 which is common to both cylinders and is formed with guide bearings 10 for the two rods, which rods are connected together by a foot plate or pedal 11 at their outer ends, so that when the driver presses with his foot upon the pedal and moves the rods inward against the action of coiled springs 12 sleeved upon said rods, both pistons will be moved at the same time and force the air or other fluid out of the cylinders into the pipes or conduits leading to the several brakes.

Preferably, the cylinder 5 for supplying air to operate the brakes on the rear wheels of the vehicle, is of greater diameter than the diameter of the cylinder 6 so that a greater volume of air per unit of piston stroke distance will be forced into the conduits 3 and operate the rear brakes with greater force than the front wheel brakes. However, the cylinders may be proportioned in diameter as desired to apply more or less operating force to the rear than to the front wheel brakes, and such proportioning may be in proportion to the relative loads carried by the front and rear wheels. The relative braking power applied to front and rear wheels is thus determined in the building of the motor vehicle and may be such that an excessive braking force cannot be applied to the brakes of the steering wheels. In this construction, while all of the brakes are applied by a single operation of the foot pedal, yet the rear brakes are operated independently of the operation of the front wheel brakes and should either front or rear brakes fail to operate for any reason, the others will be operated and the car checked or stopped, and should there be a leak in either system, it will not affect the other.

In order to provide for loss of air in either line, as in case of leakage or otherwise, provision is made for recuperating such loss, consisting in providing a reduced end portion 13 at the inner end of each rod 8 and mounting thereon, the piston 7 between the shoulder thus formed and a nut 14 on the end of the rod with the piston arranged to have a longitudinal movement on the reduced end of the rod and mounting on said end portion 13 between the shoulder and piston, a valve m a- ber comprising a collar 15 and a disk 16 of leather or other suitable material interposed between the collar and the end face of the piston, said collar being formed with a recess 17 providing an air chamber which is in communication with the interior of the cylinder through a passage 18 formed in the end 13 of the rod. The extreme outer end of the cylinder adjacent its connection with the head 9 is provided with an air inlet opening 19 to admit air behind the piston and this air so admitted enters the chamber 17 upon the return or outward stroke of the piston toward the head 9, the disk packing 16 moving with the pistons upon the rod 8 leaving its seat on the collar 15 upon the beginning of such stroke due to the lost-motion mounting of the piston permitting longitudinal movement of the piston upon its piston rod and permitting the air in the outer end of the cylinder to pass between said disk and collar. Should the air pressure within the line and in the cylinder at its discharge end be less than the air pressure in the outer or head end of the cylinder at the beginning of this return stroke of the piston, the piston will move on its rod, permitting air to pass the packing disk 16 or valve and enter the cylinder, thus replenishing the air volume in the line, which volume has been reduced due to leakage or escape of air from the line during the compression stroke of the piston. The volume of air in the cylinder and line leading therefrom to the brakes, is thus maintained and the piston will remain effective to create a sufficient air pressure in the line to operate the brakes except when by accident the air line or conduit is parted or a very large and unregulated volume is permitted to escape through such break. As the air line or conduit leading to the rear brakes is supplied by the cylinder 5, and the line leading to the front brakes, by the cylinder 6, each line is operative to supply air under pressure for operating the brakes connected therein and independently of the other line, and as the pistons in both cylinders are operated at the same time by a common means, that is, the single foot pedal, all four brakes are operated at the same time and with a predetermined force depending upon the volumetric capacity of the cylinders which may be proportioned in size to determine such pressure as applied to front and rear brakes relatively. Therefore, if found desirable, the cylinder 6 may be of lesser diameter than the cylinder 5 as shown, so that the front brakes will be applied with less force than the rear brakes, and this force may be so regulated that it will never be sufficient to lock or prevent the front wheels from rotating, thus obviating the possibility of accidents due to such locking.

In order that full braking power may be applied to the front or steering wheels when the vehicle is traveling in a straight ahead line and thus secure the full benefit of the front wheel brakes in stopping the car (it being a well known fact that such front wheel brakes are the most efficient due to the forward shifting of the load), and to automatically regulate or control such power when the front wheels are turned laterally from a straight forward line of travel, a pressure relief device indicated as a whole by the numeral 20, is connected in the air line or conduit leading from the cylinder 6 to the front brakes, and this device is connected to and operated by the steering mechanism which controls the steering movement of the front wheels. This connection may be made with any suitable part of the steering mechanism, but for purposes of illustration is shown as connected to the usual downwardly extending and swinging arm 21 to which the usual drag link 22 is connected and which link transmits motion to the steering or front wheels to turn the same upon their steering knuckles (not shown) in steering the vehicle. Obviously this pressure relief device may be used in connection with other means than the cylinder and piston arrangement shown, for supplying fluid under pressure to operate the brakes and where such fluid is conducted to the front brakes by a conduit separate from that leading to the rear brakes.

This pressure relief device 20 comprises a suitable casing 23 formed with bracket arms 24 by means of which it may be rigidly secured to any suitable fixed support, such as the chassis frame of the vehicle and projecting from one end of this casing is a shaft 25 to the outer end of which is secured an operating lever or arm 26 for turning the shaft, said arm 26 being connected by a rod 27 to the swinging arm 21 of the steering mechanism so that when the arm 21 is swung by the turning of the hand or steering wheel 28 (see Fig. 1) through the usual gearing connection 29 of the steering shaft 30 with the shaft 31 upon which the arm 21 is secured, the arm 26 will be swung with the swinging movement of the steering arm 21 and the shaft 25 of the relief device will be turned either one way or the other from the normal position shown in Figs. 3 and 4, such normal position coinciding with the normal position of the steering arm 21, or the position in which said steering arm is normally held when the vehicle is proceeding forward in a straight line and the front wheels are parallel with the central, vertical, longitudinal plane of the vehicle. Upon the inner end of the shaft 25 within the casing 23, is a head 32 having longitudinally extending cam projections 33 to engage like cam projections 34 on a tubular member 35 adapted to move longitudinally within the casing but held against rotation by means of a pin 36 in the casing wall engaging a longitudinal slot 37 in the tubular member. The tube 35 is yieldingly pressed toward the head 32 to hold its cam projections in contact with the like projections on the head by a coiled spring 38 interposed between a seat on the tube and the central portion of a diaphragm or yieldable wall 39 positioned centrally within a circular chamber 40 provided therefor by forming the casing with a circular end flange 41 which is screwthreaded upon its periphery to engage an internally screwthreaded flange on a circular head 42 formed integral with a valve carrying member, the tubular body 43 of which is formed to receive a needle valve stem 44 within its longitudinal bore, which bore forms an air passage 45 open at one end into the chamber 40 and through which open end the valved end of the stem projects to engage and close an air outlet passage through a valve seat member 46 located at the axis of the diaphragm 39, carried thereby, and forming an air outlet passage through the diaphragm. The diaphragm 39 is securely held at its periphery between the outer edge portions of the flange 41 and head 42, dividing the chamber 40 into two parts, the chamber at one side of the diaphragm being constantly in free communication with the air line or conduit 4 leading from the cylinder 6 to the front wheel brakes, through a branch pipe 47 connected to the line 4 at one end and at its opposite end to a lateral connection on the tubular body 43 and opening into the passage 45. The chamber 40 at the opposite side of the diaphragm is in open communication with the atmosphere through an opening 48 in the flange 41 which forms a side wall of the chamber. The pressure of the coiled spring 38 normally holds the valve seat member 46 seated upon the tapered end of the valve stem 44 with the passage through said seat member closed, thus preventing escape of air from the air line 4 when the front wheels are in line with the rear wheels, but immediately upon turning movement of the front wheels in steering, the cam projections 33 are turned out of alignment with the cam projections 34, permitting the spring 38 to move the member 35 toward the head 32, thus relieving some of the tension on the spring 38, the amount depending upon the extent of turning movement of head 32 and dis-alignment of the cam projections, and this reduction in tension of said spring will permit the air pressure in the line 4 against one side of the diaphragm, to flex said diaphragm sufficiently to relatively unseat the valve from its seat 46 by moving the latter and allow air to escape from the line, through the diaphragm and out to the atmosphere, thus reducing the air pressure in the line and consequently the force with which the front wheel brakes will be operated. The danger of setting the front brakes with such force as to prevent the rotation of the front wheels and accidents caused by such locking of the front wheels is thus obviated.

With the arrangement of cams for releasing pressure on the diaphragm in proportion to the turning movement of the front wheels, the air pressure in the line is reduced in proportion to the angular position of the front wheels, and therefore the greater the angle of the front wheels and consequent increase in danger of excessive brake application to these wheels, the greater will be the reduction in braking force which can be applied and by a proper proportioning and adjustment of the parts all danger of retarding rotation of the front wheels to such an extent as to cause them to lock and skid is obviated. The valve stem 44 may be adjusted longitudinally within the bore of the casing member 43 for this purpose and such adjustment is provided by screwthreading the outer end of the stem to engage the screwthreaded outer end of the bore, a locking nut 49 forming also a packing gland for the outer end of the stem being provided to hold the stem in adjusted position. A further adjustment is provided to change the degree of pressure relief, by internally screw-threading the outer end of the body 23 and inserting therein a screwthreaded plug 50 which bears against the head 32 and may be adjusted in or out to adjust the head and its cams toward or from the member 35 and its cams and when adjusted is locked by clamp screws 51.

As will be readily understood, the general arrangement herein disclosed presents a number of important advantages, a few of which will be referred to.

Since the brake application and release is controlled by the movements of the foot of the driver, both hands of the latter are free to permit steering wheel manipulation. Whether the driving be straight away or on the curve, the driver is able to maintain the steering-wheel properly positioned to ensure proper braking action. This advantage is of especial importance because of the control of the brake pressure by the steering wheel movements.

The brake pressure applied depends upon the length of movement of the pistons in their strokes. A movement of the pistons for a part of the full stroke produces a definite pressure development in the connections to the brakes, and thus provides a light pressure on the brakes, an advantage when moving down hill, for instance, when a partial checking of the vehicle is desired, without, however, producing full braking action; when the latter is desired, the length of the piston movement is increased. The fact that the piston movements are produced by foot movements is of advantage in this respect, since the driver is able to more or less "feel" the resistance of the brakes, and hence is able to readily determine the best position of the pedal and the particular pressure he wishes to apply to the brakes. Due to the "feel" there is no delay in rendering the brakes active at the desired pressure.

The structure does not attempt to isolate either of the front wheels from the brake-actuating fluid activity when rounding a curve; the line connections to both wheels remain constant. This does not, however, materially affect the selectivity of the wheel to which pressure is applied to the greater extent. This latter action is obtained by utilizing the conditions present during such turning movement. Since neither front wheel is a driven wheel, each rotates on the road surface by the rolling motion set up by the movement of the vehicle; the inner wheel of the curve rolls at a slower peripheral speed than the outer wheel (and it is possible that the inner wheel might remain practically stationary); this action is present regardless of the presence or absence of the brakes on such wheels. Since the brake drums travel with the wheel in the rotation of the latter, it will be readily understood that the drums of the two wheels advance at different speeds during such time. Since the drum of the outer wheel travels at greater speed relative to its brake surface at such times, the relative movement between th two surfaces will offer greater resistance to brake pressure than with the slower traveling inner wheel, with the result that the equalizing effect tends to increase the braking pressure on the slower moving wheel. And since the pressure itself is reduced in the entire line through the pressure reducing valve arrangement controlled from the steering wheel, this compensating action is made more certain, since there is less likelihood of causing the pressure to build up from the side of the slower moving wheel in the direction of the faster moving one, the valve serving to reduce the pressure that is being made preponderatingly effective on the inner wheel side. And in this respect, the "feel" characteristic, above referred to, is of advantage, since the length of the stroke of the pistons can be varied to aid in producing this result.

And in this latter respect the particular arrangement of the reducing valve and the piston and cylinder arrangement of the brake pressure producing structure, is of advantage, due to the fact that the vent opening in the diaphragm is variable as to its area by the movement of the steering wheel, and the "feel" effect permitted by the resistance of the brake pressure as the latter develops enables the operator to determine the length of the stroke movement necessary to produce the desired effect.

And where the pressure employed is air pressure, the embodiment disclosed herein, the fact that the pressure in the connections is practically atmospheric pressure when the brake mechanism is inactive, it will be readily understood that there is no need of a storage tank for air under pressure, or any means for maintaining the pressure of the air in such tank constant. As a result, it is possible to utilize any desired pressure on the brakes by simply controlling the length of the active stroke of the pistons in their cylinders, the pressure value being dependent on the length of the active stroke, with respect to the rear wheels, the pressure for the front wheels being variable therefrom by the activity of the pressure reducing valve, when it is necessary that such variation be provided.

Taking a broad conception of the present invention, any suitable means may be provided, whereby the braking power applicable to the front brakes is limited to such an extent that locking of these wheels during their steering movement, is obviated, and further, the control of such means by the steering movement of the front wheels, whereby such power will be reduced in proportion to such steering movement, thus insuring full braking power application when the vehicle is traveling in a straight ahead direction. Also, the application of braking power to the front wheels independently of the operation of the brakes on the rear wheels, insures sufficient brake application at all times to control the vehicle. Obviously any suitable construction and arrangement falling within the terms of the appended claims may be employed to accomplish the ends sought, and I do not, therefore, limit myself to the particular construction shown.

Having thus fully described my invention, what I claim is:—

1. In a fluid pressure braking system for vehicles including fluid operated steering wheel brakes, a pressure regulating device for controlling the pressure of fluid for operating said brakes by controlling the escape of fluid during brake activity conditions, and means for operating said regulating device, including a swinging arm and an operative connection between said arm and the steering wheel turning means whereby operating pressure applied to said brakes is reduced in proportion to the turning movement of said wheels in steering the vehicle, brake applying means including fluid conduits to the brake mechanism, said conduits being permanently open to the passage of fluid.

2. In a fluid pressure braking system for vehicles as characterized in claim 1 and including brake applying means, said latter means including mechanism operative to replenish the supply of fluid during and by movement of the means to its inactive position for compensating for fluid loss caused by said regulating device.

3. In a fluid pressure braking system applicable to vehicles having steering road-wheels and steering mechanism for turning said wheels in steering the vehicle, said system including brakes applicable to said wheels, and a pressure relief device connected in said system to controllably permit fluid to escape during activity conditions and reduce operating pressure applied to said brakes, said device being operatively connected to said steering mechanism to be operated thereby, said device being inactive to prevent delivery of fluid pressure from the pressure source during activity of the device.

4. A fluid pressure braking system as set forth in claim 3 and further characterized in that said pressure relief device comprises a valve and means is provided for connecting said valve and said steering mechanism to operate said valve proportionately to the turning movement of said wheels in steering the vehicle.

5. In a fluid pressure braking system applicable to vehicles having steering road-wheels and steering mechanism for turning said wheels in steering the vehicle, said system including brakes applicable to said wheels, a pressure producing device, conduit means for conducting fluid under pressure from said pressure producing device to said brakes to operate the brakes, a pressure reducing valve connected in said conduit to controllably permit fluid pressure to escape from said conduit during brake activity conditions, means connecting said steering mechanism and valve to operate the valve in proportion to the turning movement of the wheels in steering the vehicle, and means operative in conjunction with said pressure producing device for recuperating loss of fluid from said conduit means, and further characterized in that the fluid pressure producing device is manually operated to produce the brake operating pressure and comprises a cylinder, a piston in said cylinder, and an inlet valve device for admitting fluid to the cylinder ahead of said piston when the fluid pressure in said cylinder ahead of said piston falls below the pressure of fluid supplied through said valve.

6. In fluid-pressure brake systems adapted for four-wheel brake service, a service line for the rear wheel brakes, a service line for the front wheel brakes, a brake-pressure producing unit having a piston and cylinder structure for and individual to each line with the pistons operatively connected to provide equal length of piston stroke, and means operatively connected with the service line of the front wheel brakes for controllably permitting release of air from such line as an incident of brake application, said means being operatively connected with the steering mechanism of the vehicle to control activity of the means by movements of the mechanism, the continuity of the service line to the front wheel brakes being unaffected by activity of the means whereby the length of movement of the pistons will determine the pressure value developed for brake application and said means will determine the pressure value made active in the front wheel brake application by controlling the active pressure value of the front wheel brake service line.

7. Brake mechanism as in claim 6 characterized in that the activity of the means responsive to steering mechanism movements automatically provides variations in pressure value in the service line in presence of piston strokes of equal length.

8. Brake mechanism as in claim 6 characterized in that the means includes a pressure reducing valve having a venting opening variable as to its active venting area by movements of the steering mechanism.

In testimony whereof I affix my signature.

LYLE K. SNELL.